United States Patent
Morse et al.

(10) Patent No.: US 7,347,939 B2
(45) Date of Patent: Mar. 25, 2008

(54) ADJUSTABLE CONTAMINATED LIQUID MIXING APPARATUS

(75) Inventors: Dwain E. Morse, Santa Barbara, CA (US); Wade O. Morse, Santa Barbara, CA (US); Thomas G. Matherly, Lompoc, CA (US)

(73) Assignee: Clean Water Technology, Inc., Los Angeles, CA (US)

( * ) Notice: Subject to any disclaimer, the term of this patent is extended or adjusted under 35 U.S.C. 154(b) by 414 days.

(21) Appl. No.: 10/810,928

(22) Filed: Mar. 25, 2004

(65) Prior Publication Data
US 2004/0178153 A1   Sep. 16, 2004

(51) Int. Cl.
*B01F 5/00*   (2006.01)

(52) U.S. Cl. ............... 210/512.1; 210/788; 366/165.5; 366/173.2; 366/177.1

(58) Field of Classification Search ............... 210/788, 210/512.1, 188, 221.2; 366/165.5, 173.2, 366/177.1; 209/716, 719, 730, 734; 96/211; 55/459.1, 459.4
See application file for complete search history.

(56) References Cited

U.S. PATENT DOCUMENTS

| | | |
|---|---|---|
| 2,220,574 A | 11/1940 | Little |
| 2,360,811 A | 10/1944 | Kelly et al. |
| 2,746,605 A | 5/1956 | Baum |
| 2,759,607 A | 8/1956 | Boyd |
| 2,765,919 A | 10/1956 | Juell |
| 2,779,731 A | 1/1957 | Kelly |
| 2,876,863 A | 3/1959 | Kivari |
| 2,994,432 A | 8/1961 | Schluter |
| 3,179,252 A | 4/1965 | Vrablik |
| 3,446,488 A | 5/1969 | Mail et al. |
| 3,542,675 A | 11/1970 | Mail et al. |
| 3,917,526 A | 11/1975 | Jenning |
| 3,977,970 A | 8/1976 | Willis et al. |
| 3,986,954 A | 10/1976 | George |
| 4,022,696 A | 5/1977 | Krofta |
| 4,067,813 A | 1/1978 | Pielkenrood |
| 4,193,869 A | 3/1980 | Brucker |
| 4,237,006 A | 12/1980 | Colman |
| 4,279,743 A | 7/1981 | Miller |
| 4,339,027 A | 7/1982 | Lauer |
| 4,340,487 A | 7/1982 | Lyon |
| 4,377,485 A | 3/1983 | Krofta |
| 4,397,741 A | 8/1983 | Miller |

(Continued)

FOREIGN PATENT DOCUMENTS

DE    2525550    12/1976

(Continued)

*Primary Examiner*—David A Reifsnyder
(74) *Attorney, Agent, or Firm*—Denton L. Anderson; Sheldon Mak Rose & Anderson PC

(57) ABSTRACT

An adjustable contaminated mixing apparatus includes a reactor head and a down tube extending from the reactor head. A plurality of ports are formed in the reactor head and configured to impart a spinning motion to the contaminated liquid as it passes from the reactor head into the down tube. Each port is adapted to receive a flow restrictor to permit selectively control of velocity and flow volume of the liquid through the down tube. Typically, the flow restrictors are removable flow restriction plugs inserted into in a removable cartridge of the reactor head.

3 Claims, 4 Drawing Sheets

U.S. PATENT DOCUMENTS

| | | |
|---|---|---|
| 4,744,890 A | 5/1988 | Miller |
| 4,790,944 A | 12/1988 | Gordon |
| 4,838,434 A | 6/1989 | Miller |
| 4,933,094 A | 6/1990 | Kalnins |
| 4,997,549 A | 3/1991 | Atwood |
| 5,037,559 A | 8/1991 | Schmitt |
| 5,120,435 A | 6/1992 | Fink |
| 5,139,663 A | 8/1992 | Maples |
| 5,151,177 A | 9/1992 | Roshanravan et al. |
| 5,160,610 A | 11/1992 | O'Reilly |
| 5,160,611 A | 11/1992 | Krofta |
| 5,199,684 A | 4/1993 | Maples |
| 5,224,604 A | 7/1993 | Duczmal et al. |
| 5,275,732 A | 1/1994 | Wang et al. |
| 5,284,627 A | 2/1994 | Brazelton et al. |
| 5,382,358 A | 1/1995 | Yeh |
| 5,426,054 A | 6/1995 | Popp et al. |
| 5,492,630 A | 2/1996 | Roshanravan et al. |
| 5,514,282 A | 5/1996 | Hibbard et al. |
| 5,516,433 A | 5/1996 | Suutarinen |
| 5,529,190 A | 6/1996 | Carlton et al. |
| 5,529,701 A | 6/1996 | Grisham et al. |
| 5,531,904 A | 7/1996 | Grisham et al. |
| 5,538,631 A | 7/1996 | Yeh |
| 5,591,348 A | 1/1997 | Felder et al. |
| 5,662,790 A | 9/1997 | Carlton et al. |
| 6,019,825 A * | 2/2000 | Greene et al. ............ 210/512.1 |
| 6,106,711 A | 8/2000 | Morse |
| 6,171,488 B1 | 1/2001 | Morse |
| 6,426,010 B1 * | 7/2002 | Lecoffre et al. ......... 210/512.1 |
| 6,562,240 B1 | 5/2003 | Clark |
| 6,669,843 B2 * | 12/2003 | Arnaud ...................... 55/459.1 |
| 6,797,181 B2 * | 9/2004 | Morse et al. ............ 210/512.1 |

FOREIGN PATENT DOCUMENTS

| | | |
|---|---|---|
| DE | 4136935 | 5/1993 |
| FR | 2073637 | 10/1971 |
| GB | 1444027 | 7/1976 |
| GB | 2000054 | 6/1977 |
| GB | 2035150 | 6/1978 |
| GB | 2116457 | 3/1983 |
| JP | 07-303882 | 11/1995 |
| JP | 08-132020 | 5/1996 |
| SU | 798048 | 1/1981 |
| SU | 919999 | 4/1982 |
| SU | 1555293 | 4/1990 |
| WO | WO 91/15302 | 10/1991 |
| WO | WO 94/17290 | 8/1994 |
| WO | 96/12678 | 5/1996 |
| WO | WO 97/20775 | 6/1997 |
| WO | 99/11352 | 3/1999 |
| WO | 00/07687 | 2/2000 |
| WO | 01/51164 | 7/2001 |

* cited by examiner

ADJUSTABLE CONTAMINATED LIQUID MIXING APPARATUS

BACKGROUND OF THE INVENTION

The present invention generally relates to contaminated liquid mixing apparatus. More particularly, the present invention relates to a contaminated mixing apparatus which is adjustable for precise and controlled mixing of contaminants and treatment additives in the form of gases and fluids, so as to create a generally homogenous mixture having a high bubble or gas entrainment level.

Industrial wastewater treatment presents many challenges to current technologies. Contaminants are often present in the form of suspended solids. Such solids range in size from macroscopic, hundreds of microns to inches in size, to colloidal, or sub-micron in size, or even nanoscopic particles. Immiscible oils and other oil loving substances, generally termed hydrophobic, are also sometimes present. In treating contaminated water such as wastewater or the like resulting from agricultural or industrial processes, it is necessary to mix treatment additives with the contaminated water in order to effectively remove the contaminants.

Numerous technologies have been developed to achieve efficient solid/liquid separation in industrial wastewater treatment facilities. Historically, gravimetric separations are most commonly used. Sedimentation enlarged clarifier tanks are used to separate particles with specific gravities greater than that of water. Screens and filters can be used to separate large particles as well. However, smaller particles and other substances, such as hydrophobic substances which are sometimes present and emulsified or solubilized and thus have a density closer to that of the liquid, typically water, are much more difficult to remove.

Typically, such solubilized contaminated water is treated using flotation systems. Flotation is a process in which one or more specific particle constituents of a slurry or suspension of finely dispersed particles or droplets become attached to gas bubbles so that they can be separated from water or other constituents. The gas/particle aggregates then float to the top of the flotation vessel where they may be separated from water and other non-floatable constituents.

Most wastewater solid and emulsified components such as soil particles, fats, oils and grease are charged. Wastewater processing/treatment chemicals or additives such as coagulants and flocculents are added to neutralize charge and initiate nucleation and growth of larger colloidal and suspended particles, also referred to as floccs. Floccs can arrange in size from a millimeter to centimeters in diameter when coagulation and flocculation processes are optimized. Too much chemical will recharge floccs and result in their break-up and/or permanent destruction as overcharged particles or floccs repel each other and tend to stay apart.

It is preferred that the contaminated liquid and treatment additives form a homogenous mixture such that when the dissolved gas is added and subsequently allowed to coalesce into bubbles, a good majority of the contaminants will be taken into the surface with the bubbles. If the mixture is not homogenous, an unacceptable amount of contaminants will remain in the liquid even after treatment.

In the past, treatment additives have been added to contaminated liquid in several manners. For example, treatment additives are often mixed into a tank of contaminated liquid and then mechanically stirred with a propeller or the like. However, it has been found that the treatment additives tend to "glob" to each other prematurely.

Coagulants are chemicals used to neutralize particle charge such as inorganic salts (e.g. ferric chloride) or polymers (e.g. cationic polyamines). Flocculants are large molecular weight polymers used to collect the smaller coagulated floccs into large stable floccs, facilitating solid/liquid separation. These large molecules are often coiled and have to be uncoiled plus mixed well with the incoming coagulated wastewater stream.

Coagulants are often viscous chemicals, requiring adequate mixing time and energy to mix them homogeneously with the incoming wastewater stream. Similarly, an optimum mixing energy is required for the flocculants to be uncoiled and mixed well with the incoming coagulated wastewater stream. If the polymer strands are wound or "globbed" together, the polymer can only attach a minimal amount of waste particles. If mixing is not optimized, an excessive amount of coagulant or flocculant polymer may be introduced into the contaminated liquid in an attempt to coagulate to the greatest extent possible, thus wasting valuable and expensive coagulant and polymer chemicals. However, if too much mixing energy is applied, irreversible break-up of the floccs and inefficient solid/liquid separation occurs.

In the past, it was believed that vigorous mixing over a prolonged period of time provided optimal mixing. However, the inventors have found that this is not the case. Instead, the inventors have discovered that certain treatment additives are very sensitive to the amount of mixing energy that is used. Thus, overmixing, as well as undermixing, can have deleterious effects on the additives and may alter their behavior or efficiency. The inventors have also found that mixing time for various treatment additives vary according to the mixing energy used. To effectively use coagulants and flocculants, mixing time and energy must be matched with pressurization and depressurization energy to create bubbles that are the right size to attach to the floccs and create bubbles that grow into larger bubbles after attaching to the floccs. This ensures the flotation of the flocc clusters out of the water and replacement of much of the entrained water in the flocc cluster with air.

Current technologies are not satisfactory in their ability to respond fast to a changing wastewater influent. The mixing of chemical additives is often physically destructive. It is often not efficient and generally requires a long time, causing the real life systems to be large and take up valuable real estate inside the manufacturing facilities.

Accordingly, there is a need for a mixing apparatus which is adjustable in nature so as to allow one to easily adjust the pressurization or mixing energy of a given waste water stream as its characteristics change or which can be modified between different treatment facilities which treat different wastewater streams. Such a mixing apparatus should require less additives and facilitate optimum removal of the contaminants from the liquid. The present invention fulfills these needs and provides other related advantages.

SUMMARY OF THE INVENTION

The present invention resides in a contaminated liquid mixing apparatus which can be used for precisely and controllingly mixing fluids, gases, or solids for a variety of applications. The apparatus of the present invention is particularly designed to optimize chemical addition (coagulation or flocculation) and flotation parameters, including pressure, mixing time and energy. The apparatus of the present invention is adjustable in allowing for on site fine tuning to the individual stream that is being treated. The resulting mixture is also substantially homogeneous which optimizes removal of the contaminants.

The apparatus of the present invention generally comprises a reactor head having a down tube extending therefrom. A plurality of ports are formed in the reactor head and configured to impart a spinning motion to a flow of liquid as it passes from the reactor head into the down tube. Each port is adapted to receive a flow restrictor to permit selective control of velocity and flow volume of the liquid through the down tube, and thus control mixing energy and change of pressure of the liquid. The fact of using the tangential ports is that they convert the pressure energy provided by the pump to the liquid into an acceleration energy at a generally uniform weight.

In a particularly preferred embodiment, the reactor head includes an inlet through which the contaminated wastewater is received. The reactor head defines a receiving chamber in fluid communication with the inlet and plurality of ports. Typically, the reactor head will also include a gas injection port for introduction of gas, such as air, to be entrained into the swirling liquid. Chemical injection ports may also be formed in the reaction head or down tube, but such are typically upstream of the apparatus of the present invention.

Typically, a cartridge is removably disposed within the receiving chamber and defines the plurality of ports in facets thereof. The plurality of ports are formed in at least one of the facets of the cartridge, and preferably in each of the facets.

In a particularly preferred embodiment, the flow restrictor comprises a removable flow restriction plug. To allow further fine tuning of the speed and volume of the liquid passing through the apparatus, at least one flow restriction plug includes a liquid passageway formed therein.

The reactor head includes means for accessing the receiving chamber and cartridge, such as a removable lid. Typically, the gas injection port is formed in the removable lid of the reactor head such that gas could be drawn into a central evacuated vortex created by the swirling liquid.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
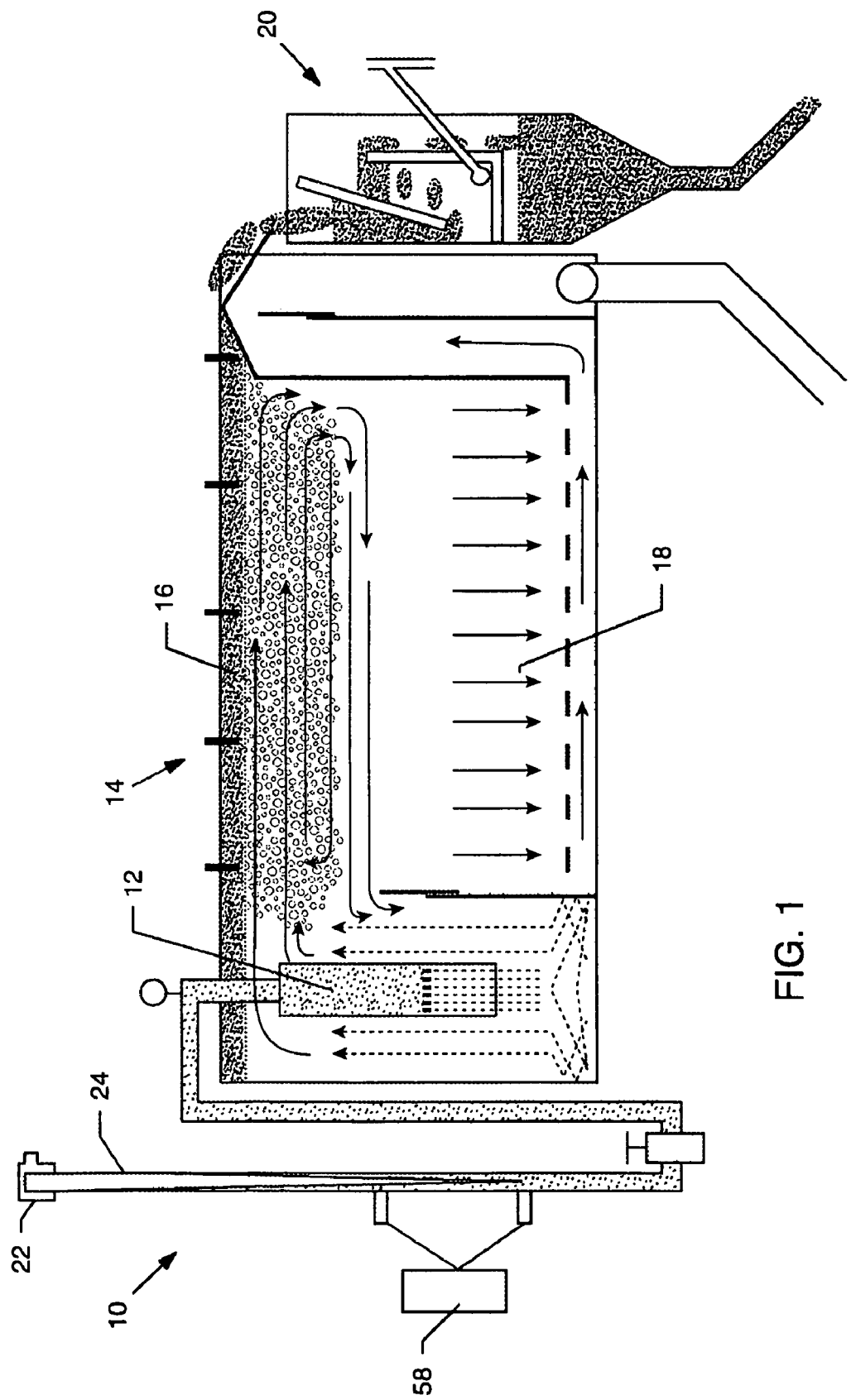
FIG. 1 is a schematic diagram of a flotation liquid decontamination system incorporating a mixing apparatus embodying the present invention.

As shown in the accompanying drawings for purposes of illustration, the present invention resides in a mixed apparatus, generally referred to by the reference number 10. With reference to FIG. 1, the mixing apparatus 10 is particularly adapted for use in dissolved air flotation systems or the like which are designed to remove contaminants from a contaminated liquid stream. The mixing apparatus 10 of the present invention, as will be more fully described herein, is configured to mix separation enhancement additive chemicals and gases with the contaminated liquid so as to create a generally homogenous mixture having extremely small bubbles attached to the flocculants such that as the liquid stream is depressurized by depressurizing device 12 and admitted into a flotation tank 14, the solid flocculant sludge 16 can be skimmed from the surface thereof and the contaminated water 18 removed. A dewatering apparatus 20 may be used to remove water from the skinned sludge 16. The mixing apparatus 10 of the present invention is particularly suited for use in the gas energy management particular flotation preparation system of currently pending U.S. patent application Ser. No. 10/810,295, now U.S. Pat. No. 6,964,740. However, the mixing apparatus 10 of the present invention can be used in other flotation systems or in other systems which require liquid-solid-gas mixing.

With reference now to FIGS. 2-5, the liquid solid gas mixing apparatus 10 of the present invention is similar to a hydrocyclone, but unlike a conventional single port hydrocyclone, the apparatus 10 of the present invention has a two-stage delivery mechanism, as will be described more fully herein. The mixing apparatus 10 is comprised of an upper reactor head 22 and a lower down tube 24 through which the mixed liquid exits at an outlet 26 thereof. The mixing apparatus is designed such that the reactor head 22 imparts a spinning motion to the contaminated liquid 28 such that a vortex is formed in the down tube 24, causing the additives, liquid, contaminants, and any entrained gas to mix thoroughly and typically substantially homogeneously.

The reactor head 22 includes a liquid contaminant inlet 30 formed in a side wall or plenum 32 thereof. A base 34 and a lid 36 create an enclosure. A cartridge 38 is disposed within the enclosure of the reactor head 22.

Figure 2:
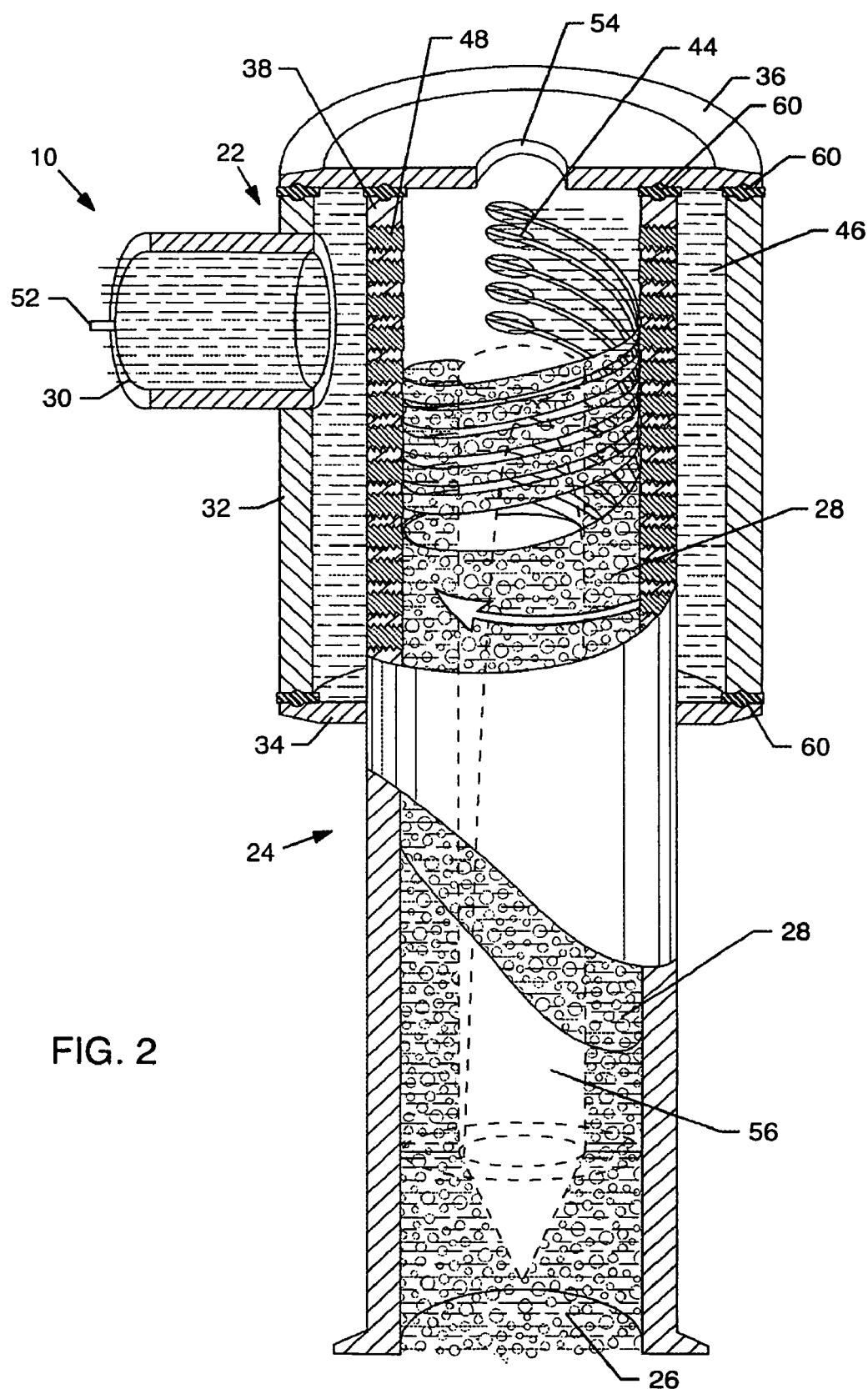
FIG. 2 is a partially fragmented cross-sectional view of the mixing apparatus of the present invention.
Figure 3:
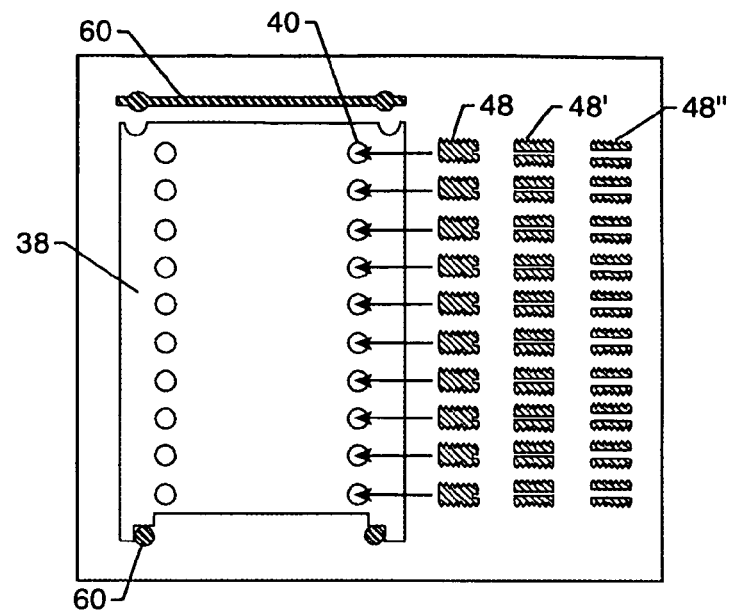
FIG. 3 is a diagrammatic view of a cartridge of the mixing apparatus of the present invention, illustrating possible restriction plugs inserted into apertures thereof.
Figure 4:
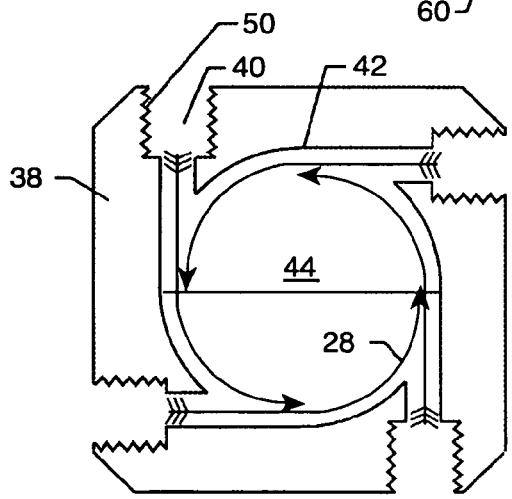
FIG. 4 is a top cross-sectional view of the mixing apparatus of the present invention, illustrating liquid entering through multiple ports thereof.
Figure 5:
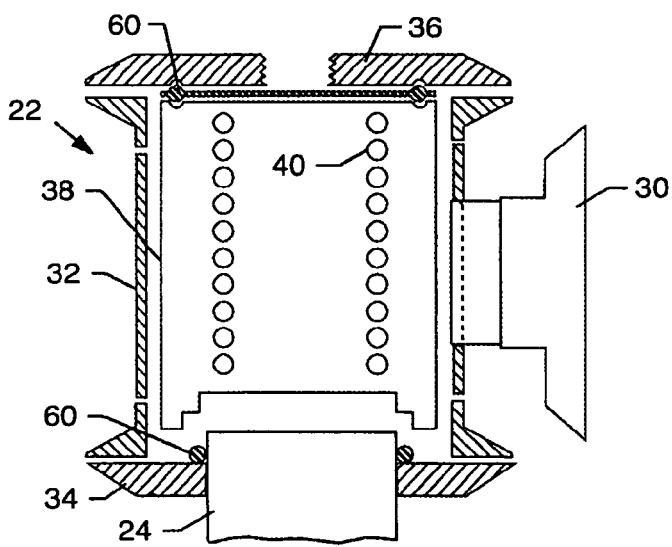
FIG. 5 is a partially fragmented and cross-sectional view of a reactor head of the mixing apparatus of the present invention, illustrating modular components thereof.

With reference to FIGS. 2-4, the cartridge 38 is a cylindrical, or more typically multi-faceted, member which is in fluid communication with the down tube 24. The cartridge 38 includes a plurality of ports 40 that extend through the wall of the cartridge block 38. The ports 40 are configured such that the liquid is directed at a generally tangential direction to an inner surface 42 of the cartridge 38 so as to have imparted thereto a spinning motion to form a vortex within the cartridge 38 and down tube 24, as illustrated in FIG. 2. Although the cartridge 38 is illustrated in FIGS. 2, 3 and 5 as being cylindrical, more typically the cartridge block 38 is multi-faceted, as illustrated in FIG. 4. The cartridge block 38 can be configured as a hexagon, octagon, or any other multi-faceted structure. It has been found that the manufacturing method of "spot facing" is particularly useful in the present invention. This enables the creation of a small facet within the cylindrical wall just surrounding the area where the port 40 is formed. This enables the restrictor plugs 48 to be more easily inserted into the tangential ports 40 as will be discussed more fully herein. Thus, the term "faceted" refers to the "spot faces" as well as an overall multi-faceted exterior confirmation. The ports 40 are formed in at least one facet thereof, and more typically in every facet thereof, as illustrated in FIG. 4. The alignment of the port pathways 40 from facet to facet can be uniform or staggered to minimize the ridges in the center spinning cyclonic chamber 44 of the cartridge block 38.

Thus, contaminated liquid flows into the reactor head 22 through inlet 30 and into a receiving chamber 46 defined by the space between the cartridge block 38 and the plenum 32, based 34, and lid 36. As the flow of liquid fills the receiving chamber 46, the liquid is directed through open port 40 in a tangential manner to create the spinning liquid, as previously discussed above and illustrated in FIG. 2. The number of open ports 40, the diameter of the ports 40 and the diameter of the inner wall 42 or cyclonic chamber 44 and the down tube 24, which are typically substantially equal in dimension, determine the speed at which the liquid spins and passes through the apparatus 10.

The diameter of the central cyclonic spin chamber, defined by the inner walls of the cartridge block 38 and down tube 24, is determined by the flow the apparatus 10 is likely to be exposed to. Although there is a wide range of flows that a given diameter apparatus 10 can properly handle, when that flow range is exceeded, the apparatus 10 will require replacement by a larger or smaller diameter chamber. For example, the cyclonic chamber with a diameter of one inch can handle between 0.1 to 10 gallon per minute flow. A two inch diameter cyclonic chamber can handle between 5 and 80 gallon per minute flow. A three inch cyclonic chamber diameter can handle flows between 70 to 250 gallons per minute. A six inch diameter cyclonic chamber can handle flows between 500 to 2000 gallons per minute. It should be noted that the upper range of these flow rates are not limited by the cyclone chamber, but by the cost of the pumping system required to deliver the flow, the pressure requirement for the given process stream and the size of the downstream flotation device for processing and separating the resultant liquid/solid components.

Another particular unique aspect of the present invention is that the ports 40 are adapted to receive removable restrictor plugs 48. Typically, the ports are drilled and tapped so as to include threads 50 which allow the threaded restrictor plugs 48 to be threaded therein with a screw driver or other tool. Of course, other means can be utilized to removably insert the restrictor plugs 48 within the ports 40 as will be appreciated by those skilled in the art. By inserting or removing these plugs 48, the energy imparted to the spinning fluid 28 is increased or decreased. This effects the volume of liquid flowing through the apparatus 22 as well as the change in pressure of the fluid through the apparatus 10.

As described above, in the prior art, those skilled in the art claim that longer mixing time (1-10 minutes) at low mixing energy (30 to 100 RPM of a mechanical mixer) is needed for optimum flocculation and mixing. The inventors have discovered that this is not necessarily the case in that shorter mixing times (5-10 seconds) with high mixing energies (up to 4000 RPM with a mechanical mixer) yielded cleaner water with lower turbidity and larger floccs which are easier to float. Thus, the centrifugal mixing inside the apparatus 10 may only last a few seconds but yield excellent mixing and floccs without any mechanical premixing or potential polymer breakage. The mixing energy or speed at which the liquid 28 is passed through the apparatus 10 is determined in large part by the number of ports 40 which are opened to receive liquid. The fewer open ports 40, the higher the velocity of the spinning liquid 28.

With reference now to FIG. 3, the mixing apparatus 10 of the present invention can be further adjusted by providing restrictor plugs 48' and 48" which have apertures holes through the center thereof to permit a small amount of liquid to pass therethrough. The diameter of such small aperture holes through the plugs 48 can vary such that a large number of plugs 48 are available to the end user to adjust the mixing apparatus 10. By modifying the size of the aperture holes in the plugs 48, another degree of control over the pressure drop/acceleration of the liquid 28 can be achieved while expanding the useful flow range of a given apparatus 10 with a fixed diameter cyclonic chamber.

Additives, such as pH/Redox chemistries, flocculants, coagulants, clay, diotomatious earth, etc. are typically added to the contaminated stream to alter the isoelectric point of the liquid thereof and bind up the suspended solids in the liquid stream 28. Although this can be done upstream of the apparatus 10, the apparatus 10 of the present invention can also include inlets 52 for introducing such additives immediately before or during mixing. A gas inlet 54 is also formed in the apparatus 10, typically in the reactor head. Preferably, the gas injection port 54 is formed in the lid 36 of the reactor head 22 such that the gas introduced therethrough is fed into a central evacuated area 56 such that the spinning liquid absorbs and entrains the gas that is introduced into the apparatus 10. The lower pressure vortex cavity 56 causes the introduced gas to come into contact with the centrally rotating liquid as it spins into the down tube 24 of the apparatus 10. The gas may be continuously or intermittently added through the injection port 54. A sensor 58 may be used to sense where the central gas column 56 terminates, the physical shape of the vortex being manipulated by adding more or less gas to the central vortex 56. Such a sensor may visually, sonically, electronically, or otherwise sense the location of the vortex to determine the amount of replenishment gas to replace the gas that gets absorbed into the liquid 28 and carried downstream.

With reference now to FIGS. 2 and 5, in a particularly preferred embodiment, the reactor head 22 is modular in nature such that the lid 36 can be removed from the base plenum 32 for access to the central cartridge 38 and the restrictor plugs 48 and ports 40 thereof. Typically, a quick release clamp (not shown) holds the removable lid 36 to the plenum 32, although other means may be used such as threaded attachments, etc. Gaskets 60 are typically used to seal the lid 36 to the cartridge 38 and plenum 32. With the removable lid 36, the center cartridge 38 can be easily accessed for adjustment. The cartridge 38 can be easily pulled up out of the pressure chamber of the reactor head 22 for the addition of more plugs 48, or the replacement of solid plugs 48 with drilled aperture plugs 48', or for the removal of large chunks of material or thin films of mineral build-up that might accumulate in either the pathways 40 or cyclonic chamber 44. An item of great importance to the operator of the apparatus 10 is that any liquid 28 that is present inside the reactor head 22 during one of these adjustments falls back into the pressure chamber/cyclonic chamber when the center cartridge 38 is lifted out, leaving the floor free of spills.

Thus, if the contaminated liquid source changes, the mixing apparatus 10 of the present invention can be altered to properly mix in the additives and gas as are determined necessary. As discussed above, opening or closing some of the ports 40, as well as lowering or increasing the inlet pressure can manage the magnitude of mixing forces. Most contaminants, and their corresponding charge satisfaction additives, have been found to have a mixing energy "sweet spot" where flocculation performance is enhanced. Tuning the mixing energy is a significant, but up to now overlooked, component of flotation system design and mixing methodologies.

Figure 6:
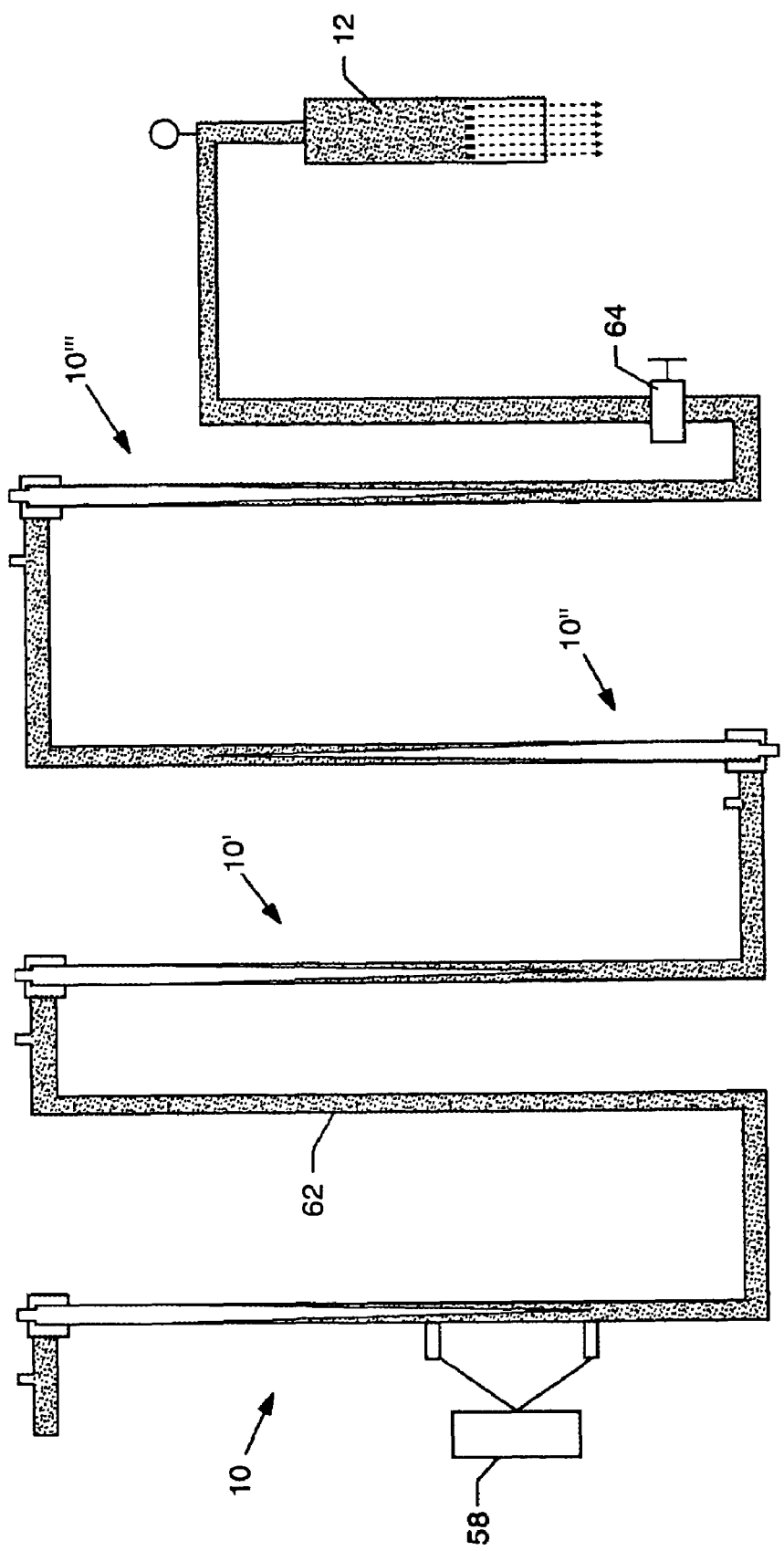
FIG. 6 is a diagrammatic view illustrating several mixing apparatuses embodying the present invention placed in series in accordance with the present invention.

If necessary, a series of mixing apparatuses 10-10''' may be configured as illustrated in FIG. 6. As few as a single mixing apparatus 10 or multiple mixing apparatuses in fluid connection series, as shown in FIG. 6, may be utilized depending upon the amount of mixing energy and time required to optimize the separation. Connecting in series a plurality of mixing apparatuses 10 allows sequential injection of chemicals at optimum mixing energy for each chemical constituent individually, and multiple gas dissolving vortex exposures. If the energy to optimize the gas-mixing vortex is not sufficient to saturate the stream as a result of soft chemical mixing energy requirements or the like. Dedicated mixers for only gas entrainment may be used before the chemical mixing states. (e.g. gas in heads 1 and 2, chemistry in heads 4, 5, 6). As will be appreciated by one skilled in the art, tubing 62 interconnects the outlet 26 and inlet 30 of each apparatus 10. In FIG. 6, an adjustment valve 64 is placed at the end of the series of mixing apparatuses 10 to control the pressure of the liquid stream before it is delivered to the pressure reducing device 12. Changing the impeller size of the pump, or the use of a variable frequency pump controller could also be used to control the gross flow and pressure characteristics of the liquid passing through the apparatuses 10.

Thus, one skilled in the art will appreciate that the mixing apparatus 10 of the present invention permits the simultaneous entrainment of dissolved gas to any required level for the formation of necleation sites where bubbles will later form inside the structure of the floc. These gases (nanobubbles) that are trapped inside the evolving floccs are the sites where dissolved gas will deposit as the pressure of the mixing system is decreased, forming large buoyant bubbles that will carry the floccs to the surface of the water for removal. The mixing apparatus of the present invention allows the adjustment and rotational energy applied to the liquid/chemical mixture, the amount of time that the liquid/chemical is subjected to mixing, and the amount and type of gas dissolved in the liquid. The amount of energy that is left over in the liquid which will be available for downstream bubble flotation can also be altered. Moreover, the sequence and frequency of chemical additions as well as the amount of chemistry added can be controlled and fine tuned.

Other features and advantages of the present invention will become apparent from the following more detailed description, taken in conjunction with the accompanying drawings, which illustrate, by way of example, the principles of the invention.

What is claimed is:

1. A contaminated liquid mixing apparatus, comprising:
a reactor head;
a down tube extending from the reactor head and in fluid communication therewith; and
a plurality of ports formed in the reactor head and configured to impart a spinning motion to a flow of liquid as it passes from the reactor head into the down tube, wherein each port is adapted with threads to receive a threaded flow restrictor to permit selective control of velocity and flow volume of a liquid through the down tube.

2. A contaminated liquid mixing apparatus, comprising:
a reactor head;
a down tube extending from the reactor head and in fluid communication therewith;
a plurality of ports formed in the reactor head and configured to impart a spinning motion to a flow of liquid as it passes from the reactor head into the down tube, wherein each port is adapted to receive a flow restrictor to permit selective control of velocity and flow volume of a liquid through the down tube; and
at least one flow restrictor removably disposed within one of the plurality of ports.

3. The apparatus of claim 2, wherein the plurality of ports are drilled and tapped so as to include threads, to thus allow the at least one flow restrictor to be threaded into one of the plurality of ports.

* * * * *